HIGH FREQUENCY TRANSMISSION LINE COUPLING DEVICE

Filed Dec. 3, 1954 2 Sheets-Sheet 1

Caleb W. Bales
INVENTOR.
BY [signature]
Attorney

HIGH FREQUENCY TRANSMISSION LINE COUPLING DEVICE

Filed Dec. 3, 1954 2 Sheets-Sheet 2

Caleb W. Bales
*INVENTOR.*
*BY* [signature]
Attorney 2,860,308

HIGH FREQUENCY TRANSMISSION LINE COUPLING DEVICE

Caleb W. Bales, Nashua, N. H., assignor, by mesne assignments, to Sanders Associates, Incorporated, Nashua, N. H., a corporation of Delaware Application December 3, 1954, Serial No. 472,860

6 Claims. (Cl. 333—10)

The present invention relates to high frequency electric transmission line directional coupling devices. More particularly, the invention relates to directional coupling devices as used particularly in microwave printed circuits.

High frequency transmission line directional coupling devices are well known in the prior art. Such devices have been developed for use with coaxial line, waveguides, and more particularly microwave printed circuit transmission lines. Microwave printed circuit transmission lines are typically flat strip lines having a pair of ground plane conductors with a flat strip signal conductor disposed in parallel spaced relation between the ground plane conductors. Directional couplers for flat strip line are limited because of the form factor, the degree of coupling that can be achieved and in the range of impedance over which proper matching can be obtained.

It is therefore an object of the present invention to provide an improved high frequency electric transmission line coupling device wherein the degree of coupling can be adjusted over a relatively wide range.

It is a further object of the present invention to provide an improved high frequency electric transmission line coupling device that is simple in construction and reliable in operation.

Still a further object of the invention is to provide an improved coupling device of the type described wherein proper impedance matching between the various loads and the characteristic impedance of the line is readily obtained.

Other and further objects of the invention will be apparent from the following description of a preferred embodiment thereof, taken in connection with the accompanying drawings.

In accordance with the invention there is provided a composite high frequency transmission line coupling device for coupling energy from a transmission line to a desired load. The device comprises a pair of planar, outer conductors providing ground planes and a pair of elongated, planar, inner conductors disposed in different planes in register, in parallel with, and in insulated spaced relation between the outer conductors. The inner conductors are connected together to operate electrically as a single conductor to provide a transmission line. A coupling conductor is disposed in coupling proximity adjacent the inner conductors and in insulated spaced relation thereto along a plane extending therebetween. In this manner, coupling of the electric fields may be effected with the coupling conductor adapted to couple energy to the desired load.

Figure 1:
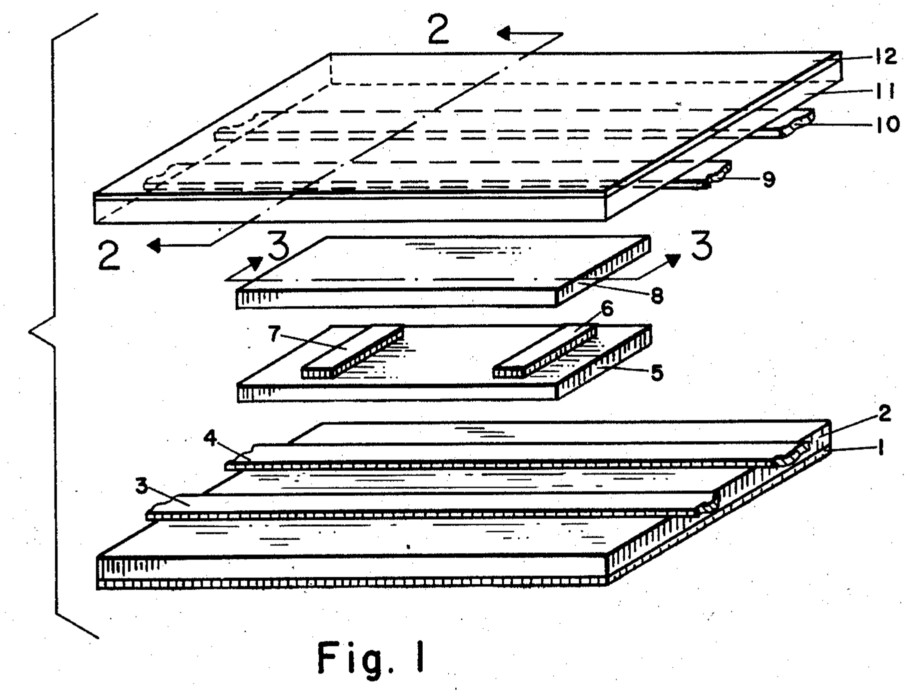
Fig. 1 is a fragmentary, isometric, exploded view of a preferred embodiment of the invention.
Figure 2:
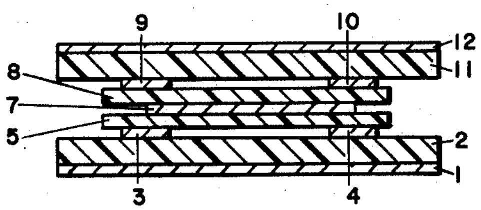
Fig. 2 is a cross-sectional view of the preferred embodiment taken along the lines 2—2 in Fig. 1.
Figure 3:
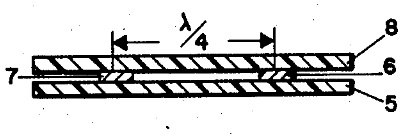
Fig. 3 is a cross-sectional view of a part of the preferred embodiment taken along the lines 3—3 in Fig. 1.

Referring now to the drawings and with particular reference to Figs. 1, 2 and 3, the composite high frequency electric transmission line coupling device illustrated comprises a first transmission line having a first pair of elongated outer conductors 1 and 12 (formed, for example, of copper .001 inch thick). A first pair of elongated inner conductors 3 and 9 are held in insulated spaced relation to the outer conductors 1 and 12 by the first insulating means 2 and 11 (formed, for example, from Teflon-Fiberglas laminate).

A second transmission line is provided having a second pair of elongated outer conductors represented as 1 and 12 and a second pair of inner conductors 4 and 10. A second insulating means, as represented by members 2 and 11, holds the second inner conductors in insulated spaced relation to the second pair of outer conductors. The conductors are thus disposed in different planes, in register, in parallel with, and in insulated spaced relation between the outer conductors. As shown particularly in Fig. 6, the inner conductors are electrically connected together to operate electrically as a single conductor. A pair of elongated coupling conductors 6 and 7 are disposed transversely of and between the first and second pairs of inner conductors, as shown, in coupling proximity with the inner conductors. The coupling conductors 6 and 7 are displaced in the direction of the transmission lines one-quarter wave length apart, at the operating frequency. A third insulating means represented by members 5 and 8 holds the coupling conductors 6 and 7 in spaced insulated relation between each of the pairs of inner conductors.

Figure 4:
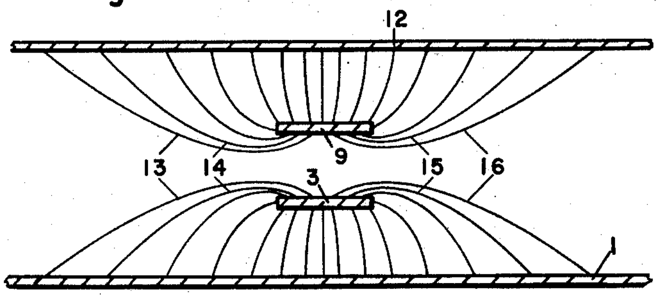
Fig. 4 is a schematic, enlarged cross-sectional view illustrating an aspect of the electric field distribution of the preferred embodiment.

In Fig. 4 the electric field distribution, obtained when the inner conductors are spread apart, is illustrated.

Figure 5:
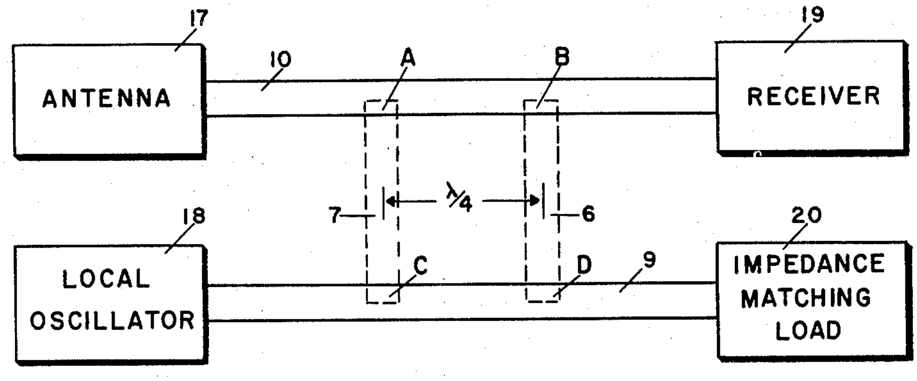
Fig. 5 is a schematic diagram illustrating a typical application of the present invention.

In Fig. 5 a typical application of the invention is shown, wherein an antenna 17 is connected through an inner conductor 10 to a receiver 19. There is, of course, a parallel connection between the antenna and the receiver 19 through an inner conductor 4 (Fig. 1), which is not shown in Fig. 5. A local oscillator 18 is connected through the inner conductor 9 to an impedance matching load 20. Energy is coupled from the transmission line of which the inner conductor 9 forms a part, to the transmission line of which the inner conductor 10 forms a part, through coupling conductors 6 and 7.

Figure 6:
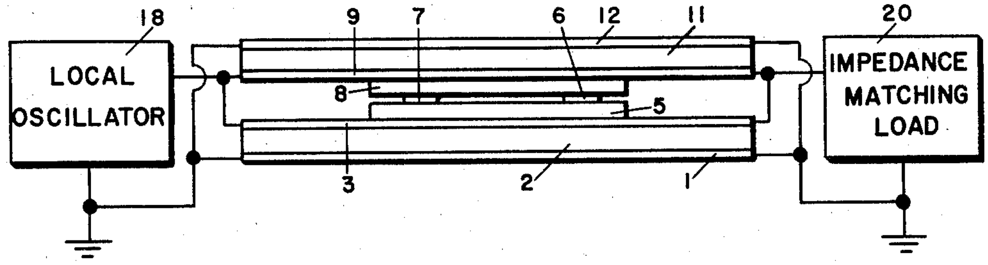
Fig. 6 is a schematic circuit diagram illustrating transmission line connections.

The operation of the invention will be described first with particular reference to Figs. 5 and 6. It is to be understood that energies referred to exist in the fields between the inner and outer conductors except as hereinafter described. The local oscillator 18 and the load 20 are connected between the outer and inner conductors as shown in Fig. 6. The antenna 17 and the receiver 19 are similarly connected. The output of the oscillator 18 is coupled along the conductor 9 to the load 20. At the location C a portion of the energy is coupled through the conductor 7 to the inner conductor 10. At the location D more of the energy from the oscillator 18 is coupled to the conductor 10 through the conductor 6. It will be noted that all of the energy traveling from the oscillator 18 to the receiver 19 follow paths of equal lengths and therefore appear in phase at the input of the receiver 19. In particular, it will be noted that the path C—D and D—B is equal to the path C—A and A—B.

Now, considering energy traveling from the local oscillator to the antenna 17, a portion of the output of the oscillator 18 is coupled through the conductor 7 to appear at the point A. Another portion of the coupled energy from the oscillator 18 is coupled through the conductor 6 and back to the point A. It will be noted that this latter path is precisely one-half wave length longer than the former. Thus, the path C—D, D—B and B—A is a half-wave length longer than the path C—A. The energy appearing at the point A then is precisely 180° out of phase and is canceled out. As much as 60 db of attenuation is noted between energy at the oscillator 18 and the antenna 17.

As has been described above and shown in particular with reference to Figs. 2 and 3, the coupling conductors 6 and 7 couple energy from the fields between the inner conductors 3 and 9, and 10 and 11. Consequently, if the inner conductors were not separated as shown in Fig. 4, or were relatively very wide, there would be no fields therebetween. It is precisely the separation between these conductors that distorts the electric field in such a manner as to permit coupling therebetween.

The lengths and widths of the coupling conductors, the thicknesses of the insulating means 5 and 8 and the dielectric constant of the insulating means 5 and 8 may all be independently varied to define the coupling characteristics of the device. To increase the band-pass characteristic (operating frequency range) of the device, one of the coupling conductors is preferably adapted to be moved relative to the other.

The structure of the present invention permits the configuration of the coupling conductors to be adjusted to provide for such devices as variable attenuators.

In an embodiment built and tested for operation at a frequency of 3000 megacycles, the outer conductors 1 and 12 are 3 inches wide; the inner conductors 3, 4, 9 and 10 are .100 inch wide and spaced apart transversely .75 inch. The coupling conductors 6 and 7 are .050 inch wide and .75 inch long. The insulating layers 2 and 11 are each .062 inch thick and the insulating layers 5 and 8 are each .005 inch thick by 1.250 inches long by 1.250 inches wide. The conductors 6 and 7 are .643 inch apart and centered transversely relative to the inner conductors 9 and 10.

As will be apparent from the above description, the present invention is a practical improvement in the art of high frequency electric transmission line devices in that it provides far more reliable and efficient device than has heretofore been available.

While there has been hereinbefore described what is at present considered a preferred embodiment of the invention, it will be apparent that many and various changes and modifications may be made with respect to the embodiment illustrated, without departing from the spirit of the invention. It will be understood, therefore, that all such changes and modifications as fall fairly within the scope of the present invention, as defined in the appended claims, are to be considered as a part of the present invention.

What is claimed is:

1. A composite high frequency transmission line coupling device for coupling energy from a transmission line to desired load, comprising: a pair of planar, outer conductors providing ground planes; a pair of elongated, planar, inner conductors disposed in different planes, in register, in parallel with and in insulated spaced relation between said outer conductors and electrically connected together to operate electrically as a single conductor to provide a transmission line; and a coupling conductor coupled to said load and extending into a space between said inner conductors and insulated with respect thereto for effecting coupling from said transmission line to said load.

2. A composite high frequency transmission line coupling device, comprising: a pair of planar, outer conductors providing ground planes; a pair of elongated, planar, inner conductors disposed in different planes, in register, in parallel with and in insulated spaced relation between said outer conductors and electrically connected together to operate electrically as a single conductor to provide a transmission line; a first coupling conductor transversely disposed with respect to said inner conductors in insulated spaced relation in a space between said inner conductors whereby coupling of the electric fields may be effected; and a second coupling conductor transversely disposed with respect to said inner conductors and in insulated spaced relation in another space between said inner conductors longitudinally separated from said first coupling conductor by an odd integral number of quarter-wave lengths at the operating frequency of said line whereby coupling of the electric fields may be effected to selected loads.

3. A composite high frequency transmission line coupling device, comprising: a pair of planar, outer conductors providing ground planes; a first pair of elongated, planar, inner conductors disposed in different planes, in register, in parallel with and in insulated spaced relation between said outer conductors and electrically connected together to operate electrically as a single conductor to provide a first transmission line; a second pair of elongated, planar, inner conductors disposed in different planes, in register, in parallel with and in insulated spaced relation between said outer conductors and electrically connected together to operate electrically as a single conductor to provide a second transmission line; a first coupling conductor transversely disposed in insulated spaced relation in spaces between each of said pairs of inner conductors in coupling proximity therewith; and a second coupling conductor transversely disposed in insulated spaced relation in spaces between each of said pairs of inner conductors in coupling proximity therewith and longitudinally separated from said first coupling conductor by an odd integral number of quarter-wave lengths at the operating frequency of said line.

4. A composite, unitary, high-frequency, electric transmission line coupling device, comprising: a first lamination section having an elongated insulator panel, an elongated, planar, outer conductor affixed to one side of said panel, an elongated, planar, inner conductor, narrower than said outer conductor, affixed to the opposite side of said panel; a second lamination section having an elongated insulator panel, an elongated, planar, outer conductor affixed to one side of said panel, an elongated, planar, inner conductor, narrower than said outer conductor, affixed to the opposite side of said panel, said inner conductors being adjacently disposed in different planes, in register and in parallel; means connecting said inner conductors together to operate together as a single conductor; and a coupling conductor for coupling said line to another, said coupling conductor being transversely disposed in insulated spaced relation in a space between said inner conductors in coupling proximity therewith.

5. A composite, unitary, high-frequency, electric transmission line coupling device, comprising: a first lamination section having an elongated insulator panel, an elongated, planar, outer conductor affixed to one side of said panel, and a pair of parallel, elongated, planar, inner conductors, each narrower than said outer conductor, affixed to the opposite side of said panel, said inner conductors being adjacently disposed in different planes, in register and in parallel; a second lamination section having an elongated insulator panel, an elongated, planar, outer conductor affixed to one side of said panel, and a pair of parallel, elongated, planar, inner conductors, each narrower than said outer conductor, affixed to the opposite side of said panel; means connecting pairs of said inner conductors together to operate as a pair of parallel single conductors; a first coupling conductor, for coupling said pair of parallel single conductors in coupling proximity therewith, transversely disposed in insulated spaced relation in spaces between each of said pairs of inner conductors; and a second coupling conductor, for coupling said pair of parallel single conductors in coupling proximity therewith and transversely disposed in insulated spaced relation in spaces between each of said pairs of inner conductors longitudinally separated from said first coupling conductor by an odd integral number of quarter-wave lengths at the operating frequency of said line.

6. A composite high frequency transmission line coupling device for coupling energy from a transmission line to a desired load, comprising: a pair of planar, outer conductors providing ground planes; a pair of elongated, planar, inner conductors disposed in different planes in register, in parallel with and in insulated spaced relation between said outer conductors and electrically connected together to operate electrically as a single conductor to provide a transmission line; and a coupling conductor disposed in coupling proximity adjacent said inner conductors and in insulated spaced relation therewith along a plane extending therebetween whereby coupling of the electric fields may be effected, said coupling conductor being adapted to couple energy to said desired load.

References Cited in the file of this patent

UNITED STATES PATENTS 2,423,390 Korman ---------------- July 1, 1947

OTHER REFERENCES

"Proceedings of the I. R. E.," December 1952, pages 1662 and 1663.

"Electronics," vol. 27, No. 9, September 1954, pages 148–150.